Figure 3:
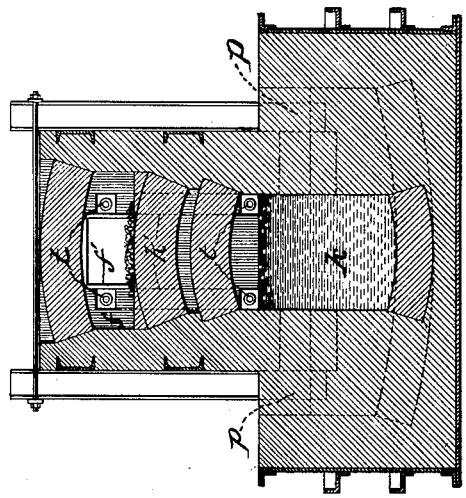

F. T. SNYDER.
PROCESS OF TREATING ZINC ORES.
APPLICATION FILED JUNE 23, 1905.
933,133.
Patented Sept. 7, 1909.
2 SHEETS—SHEET 1.
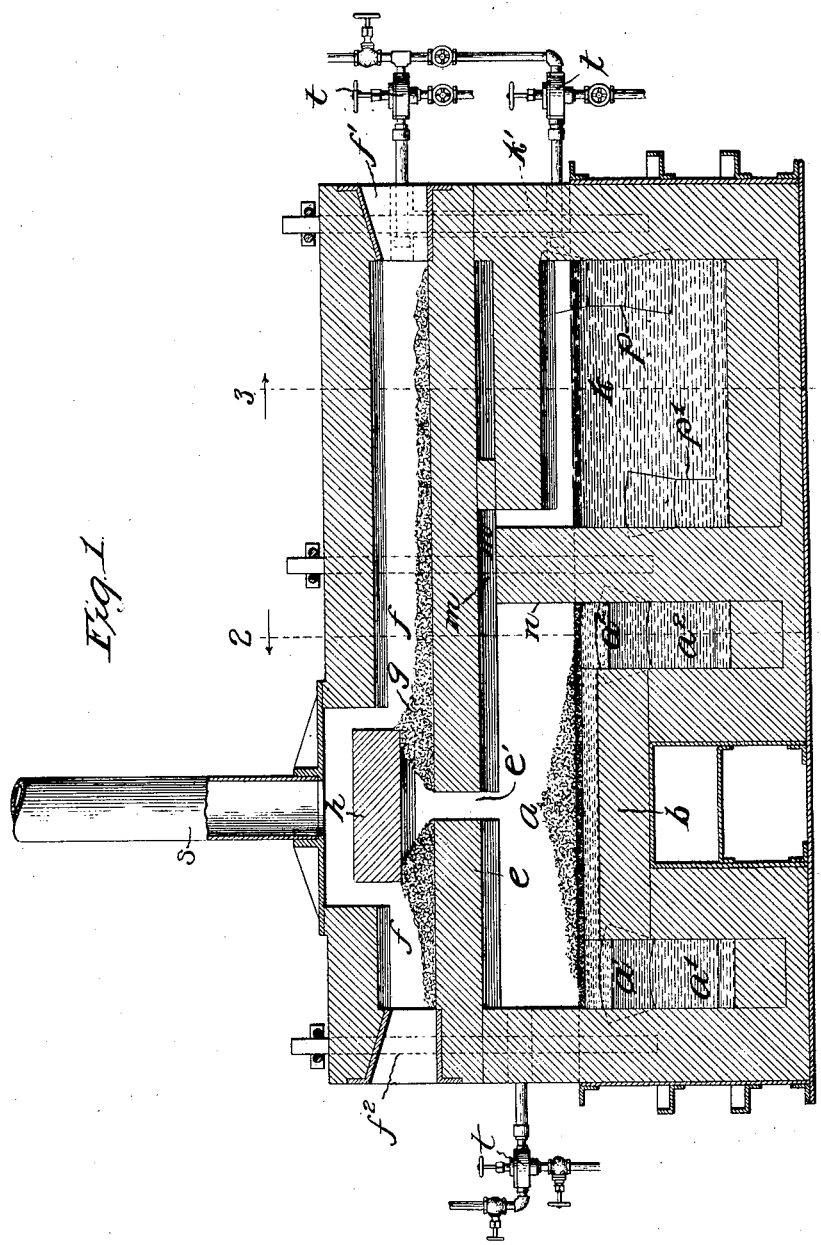
Witnesses:
Geo. C. Davis
Irving Mac Donald
Inventor:
Frederick T. Snyder,
By Barton Barton
Attys

F. T. SNYDER.
PROCESS OF TREATING ZINC ORES.
APPLICATION FILED JUNE 23, 1905.

933,133.

Patented Sept. 7, 1909.
2 SHEETS—SHEET 2.

Witnesses:

Inventor
Frederick T. Snyder,
By Barton Barton
Attys.

UNITED STATES PATENT OFFICE.

FREDERICK T. SNYDER, OF OAK PARK, ILLINOIS, ASSIGNOR, BY MESNE ASSIGNMENTS, TO ELECTRIC METALS COMPANY, OF CHICAGO, ILLINOIS, A CORPORATION OF WEST VIRGINIA.

PROCESS OF TREATING ZINC ORES.

933,133.  Specification of Letters Patent.  Patented Sept. 7, 1909.

Application filed June 23, 1905. Serial No. 266,541.

*To all whom it may concern:*

Be it known that I, FREDERICK T. SNYDER, citizen of the United States, residing at Oak Park, in the county of Cook and State of Illinois, have invented a certain new and useful Improvement in Processes of Treating Zinc Ores, of which the following is a full, clear, concise, and exact description.

This invention relates to a process of treating slag-forming ores containing zinc for the extraction of the zinc in metallic form, and is applicable particularly to sulfid ores containing both lead and zinc. By slag-forming ores, I refer to ores carrying materials which when roasted form a metallic oxid such as lime, iron oxid or lead oxid in addition to the zinc oxid.

The ordinary method of reducing zinc ores consists, briefly, in heating the roasted ore with carbon, in a retort, by means of external heat, air being excluded from the retort. Under favorable conditions the zinc is reduced and volatilized, and afterward collected and condensed.

Zinc ores containing any considerable amount of slag-forming materials, however, can not be commercially treated in this way, because the slag corrodes and eats through the walls of the retort. This is particularly true of a basic slag containing lime with iron, which takes up silica from the retort. The walls of the retort are necessarily thin to permit the passage of the heat to the contents, and so are soon destroyed by the slag. If it be attempted to smelt such ores in a blast-furnace such as is used in lead smelting, the oxygen of the blast burns the reduced and volatilized zinc to zinc oxid. In such case the zinc not only can not be recovered, but its presence is an actual detriment to the smelting operation, because the accumulation of the zinc oxid, which is practically infusible, clogs up the furnace and interferes with the smelting, also increasing the cost for fuel.

When ores contain relatively small quantities of zinc with lead and silver, the usual practice is to smelt them in a blast furnace for the lead and silver and make no attempt to recover the zinc, which to a limited extent can be dissolved in the slag in the form of zinc oxid, and so eliminated. The practical limit to the amount of zinc which can be slagged off is about ten per cent. For this reason the fees charged for lead smelting are always increased when there is any considerable percentage of zinc present, and ores containing more than fifteen per cent. of zinc are usually unprofitable.

A slag which is basic in character from lime, can not be used in the blast-furnace process of lead smelting, where zinc oxid must be disposed of, because zinc oxid will not readily dissolve in such a slag; and as before stated, in the zinc distillation process such a slag is especially to be avoided because it attacks the clay retorts.

There are large quantities of lead-zinc sulfid ores containing, for example, approximately thirty per cent. of zinc and ten per cent. of lead, which have heretofore been commercially neglected, because of such practical difficulties in the way of successful reduction, and because the recovery of either metal alone would not pay for the cost of treatment. The process of my invention is particularly applicable to the treatment of such ores, and makes it possible to recover nearly all of both the lead and the zinc in a single smelting operation.

In accordance with my invention, the ore having first been roasted to convert the sulfids into oxids, is mixed with fluxes such as lime and iron (unless already present) in such proportions as when smelted to produce a slag which will form at a temperature between the volatilization temperatures of zinc and lead. This charge is first preheated in the presence of the carbon to be used in smelting, so as to start the process of reduction as far as possible and drive off the non-metallic gases, while keeping the free surface of the charge sufficiently cool to prevent vaporization and loss of zinc at this stage. Finally, after such preheating, the ore is smelted upon a slag bath floated upon a molten lead electrode in a closed electric furnace from which air or other extraneous gas is excluded, the heat being produced by electric current passed through the slag between the molten lead electrode and another electrode (which may be of the same kind) in contact with the slag; the residues being completely fused. The metals are thus reduced, the molten lead sinking to the bottom of the furnace while the zinc is volatilized and escapes from the body of the charge as a gas, which is later condensed. An important consideration is the composition of the charge so that when smelted the slag will form at a temperature between the volatilization temperatures of zinc and of lead, will possess the characteristics of low specific gravity and high electrical resistance, and will have practically no tendency to dissolve and retain zinc oxid. A slag which is high in lime or other ingredient which has a chemical tendency to displace zinc oxid in the combination will answer these requirements. The precise composition of the slag in any case will depend largely upon the character of the ore under treatment.

The presence of considerable quantities of lime in the slag is desirable for the further reason that the specific electrical resistance of the slag is thereby made high, thus providing for the effective development of heat when an electric current is passed through the slag. But in any case the materials of the furnace charge should be thoroughly heated before smelting so as to drive off so far as possible all gases, such as carbon monoxid and dioxid which would tend to dilute the zinc vapor produced in smelting. It will also be desirable to pre-heat the ore in the presence of the carbon which is to be used in smelting, so as to start the process of reduction as far as possible without the loss of vaporized zinc, in the preliminary heating operation. The heat which remains in the ore after roasting may thus be utilized to a considerable extent for reducing a portion of the lead and probably some of the zinc, the limit being that the vaporized zinc should not be liberated above the body of the ore, but condensed within and on such body. In this way the preliminary heating of the ore with carbon takes advantage of the heat which is already in the ore from roasting to start the process of reduction, and so lessens the amount of the more costly electrical heat required for smelting. The carbon required for reduction of the ore, in the form of coke or lean coal, is therefore preferably added to the hot charge in the heating chamber after the roasting is substantially completed. If only a gaseous coal is available, it can be mixed with the ore and then heated in a reducing atmosphere until the gas is driven off. When the process of reduction has been carried as far as possible in the preliminary heating chamber without loss of zinc vapor, the charge is introduced into the smelting furnace and the reduction carried on in the absence of air, heat being developed inside the furnace by the passage of an electric current.

As an additional means of preventing the zinc oxid and lead oxid from dissolving in the slag, a layer of incandescent carbon should be maintained floating on the surface of the molten slag bath; and the furnace charge is fed into contact with this hot carbon. Before the metallic oxids can reach the body of the slag, they are reduced by the carbon, the metallic zinc being volatilized and rising through the ore, while the metallic lead, in liquid form, being insoluble in the slag, sinks through it and settles in a body underneath. The carbon layer floating on the slag also serves to support and buoy up the mass of unreduced ore, so that the volatilized zinc can readily escape without passing through the body of slag. In making up the furnace charge there should be enough carbon present to provide an excess of about ten per cent. over that which is theoretically required for the reduction of the zinc and lead oxids, the excess going to maintain the floating bath of carbon. Otherwise this carbon would be gradually coated with and entangled by the slag and carried away when the excess of slag is tapped off.

In dealing with ores containing both zinc and lead, I mix the materials of the furnace charge in such proportions as to produce a slag which will form at a temperature between the volatilization temperatures of zinc and lead, that is to say, at a temperature approximately between 1000° and 1100° centigrade; the materials, furthermore, being proportioned so that the slag formed at such temperature will be substantially saturated with an alkaline oxid, such as lime. A slag containing approximately 30 per cent. of lime, 30 per cent. of iron oxid and 40 per cent. of silica (or their respective equivalents) will have the desired characteristics. When the furnace is continuously supplied with materials which will unite to form such a slag, at the temperature required, it is evident that when this temperature is reached, any further energy supplied to the furnace in the form of heat will be expended in the reduction of the ore and formation of slag, instead of increasing the temperature of the furnace. By properly selecting and proportioning the materials of the charge, as above described, and keeping the furnace supplied therewith, I am therefore enabled to prevent the temperature in the furnace from rising to a point at which the lead as well as the zinc would volatilize. The lead and zinc therefore upon being reduced will be separated, the zinc being vaporized, while the lead collects in liquid form below the slag, where it may be drawn off. The volatilized zinc may be condensed in liquid form in a separate vessel. The absence of air in the furnace makes this possible, since the reduced zinc will not be oxidized as in the blast-furnace lead smelter. In order that the zinc may be condensed in a liquid form, however, it is necessary that the zinc vapor should be, so far as possible, free from diluting gases, such as carbon monoxid. This is an additional reason for the use of an alkaline oxid flux, such as lime, in place of the limestone or calcium carbonate ordinarily used in lead smelting. If the limestone were used in the smelting, sufficient quantities of carbon monoxid would be given off in the process of reduction to dilute the zinc vapor to an undesirable extent, so that it would condense in the form of zinc dust instead of in the form of liquid zinc.

The metallic lead sinking below the slag may be divided by a bridge wall of the furnace into two molten electrodes which may serve to convey the electric current to and from the slag. In such case the heat is developed principally in the slag uniting the two electrodes, which is of high electrical resistance by reason of the excess of lime or other alkaline oxid present.

Another feature of my invention consists in utilizing the residue gases from the zinc condenser for heating purposes. Such gases will contain carbon monoxid, which, after the zinc has been removed, may be burned to carbon dioxid by mixing with air. The heat produced may be utilized to assist in the roasting of the raw ores, and when this is done, the small amount of zinc which is carried away by such gases, is burned to oxid and returned again to the furnace, and so saved.

The accompanying drawings illustrate an electric furnace especially designed for the practice of my improved process.

Figure 2:
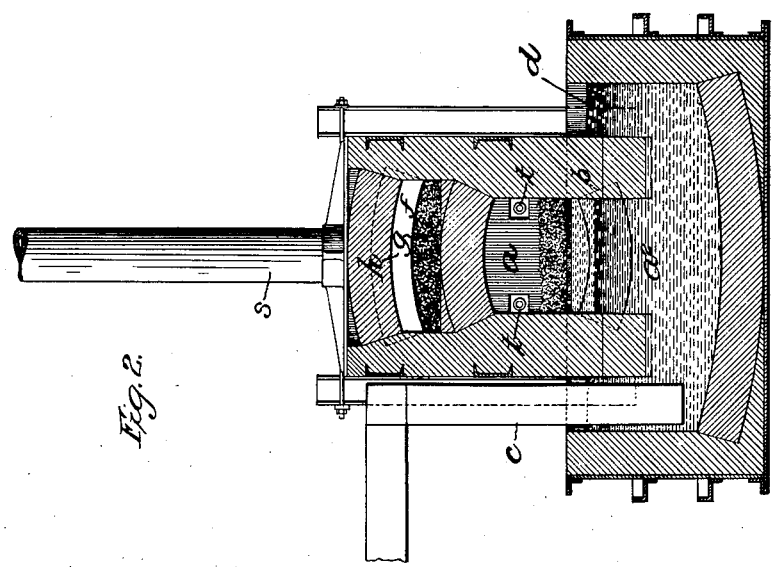

Figure 1 is a longitudinal sectional elevation of the furnace; Fig. 2 is a view in cross section on line 2—2 of Fig. 1; and Fig. 3 is a view in cross section on line 3—3 of Fig. 1.

The same letters of reference designate the same parts wherever they appear.

The lower portion of the main chamber $a$ of the furnace is divided by a bridge $b$ forming two wells $a'$ $a^2$ which communicate by U-shaped passages with the exterior of the furnace, as shown in Fig. 2. The electric conductors $c$ are dipped into the molten metal in the outer arms of these U-shaped passages, the molten metal in said wells $a'$ $a^2$ serving as electrodes connecting with the slag bath of the furnace. It is intended that there shall be sufficient material in the furnace so that the slag will rise to a level somewhat higher than the top of the bridge $b$. The two molten electrodes in the wells $a'$ $a^2$ will be electrically united by the body of slag which lies upon the bridge and floats upon said molten electrodes at either side of said bridge. The molten slag is electrically conducting, but of considerably higher resistance than the molten electrodes; and since the heating effect of an electric current increases with the increase of resistance of the conductor through which the current is passed, it will be seen that in my furnace the maximum heating effect of the current will be developed in the slag at the top where it is most desired. A layer of carbon is maintained floating on the surface of the slag bath, and is heated thereby to incandescence. As the ore in the furnace is reduced, the elements of the charge go to renew and maintain the electric circuit; that is to say, the lead as it is reduced adds to the molten electrodes, while the other elements of the charge go to maintain the slag bath and the bed of incandescent carbon floating on its surface.

The furnace shown is constructed with the preliminary heating or roasting chamber $f$ located above the main smelting chamber $a$. An opening $e'$ is provided in the reverberatory roof of the smelting chamber through which the roasted ore may be fed into said smelting chamber. A roof $h$ is provided immediately over the opening $e'$ and the materials in the chamber $f$ are so heaped up around the edge of said opening that they reach up to the roof $h$, whereby said opening is normally sealed to prevent the escape, through said opening, of gases from the smelting chamber $a$. It is intended that these gases, which contain the reduced and volatilized zinc, shall pass into a chamber $k$ where the zinc may be condensed. In Fig. 1 the condensing chamber $k$ is seen at one end of the furnace communicating with the chamber $a$ by a passage $m$ which leads over a bridge wall $n$ dividing the two chambers.

Flues $k'$ $k'$ lead up through the wall of the furnace and open into the upper roasting chamber $f$, so that the uncondensed gases escaping through said flues may be burned in said last-mentioned chamber to assist in the roasting process. A very considerable amount of energy is thus obtained from the carbon monoxid being burned to dioxid. From the roasting chamber the products of combustion finally escape through a stack $s$.

In the furnace illustrated, the wells $a'$ $a^2$ communicate by U-shaped passages with corresponding wells $d$ opening outside the furnace, through which the molten metal may be ladled out. Similarly, the condensing chamber $k$ communicates with the exterior of the furnace by U-shaped passages $p$ $p'$, the outer arms of which form wells through which the metal condensed in said chamber may be removed. Some lead vapor may be carried over with the zinc into the chamber $k$, where it will be condensed and will settle at the bottom of said chamber, from which it may be drawn off through a passage $p'$. The condensed zinc is drawn off through the passages $p$ which are located nearer the top of the chamber above the level of the lead. The condensing chamber thus serves also for the purpose of refining the zinc.

Oil burners $t$ $t$ are preferably provided for heating the furnace at starting. It is necessary, of course, to heat the slag in the chamber $a$ to a molten condition before the electric current can be passed through it, and the oil burners are provided for this purpose. During the smelting operation, however, the burner applied to the chambers $a$ and $k$ are shut off and the openings plugged up with clay. The burners in the upper portion of the flues $k'$ leading to the heating chamber $f$ may be kept in operation during the smelting, if desired, to furnish additional heat for roasting. Air is admitted to the roasting chamber in order to burn the gases brought by flues $k'$ $k'$ from the lower portion of the furnace.

The operation of the furnace in carrying out my process is as follows: The ore having first been crushed, and it may be partially roasted, is introduced through the door $f'$ into the chamber $f$ where the roasting is completed, and the ore highly heated to drive off all gases as far as possible. The sulfids are almost entirely converted into oxids, and the resulting sulfurous gases, and the steam produced from any moisture which may have been present, together with the products of combustion, and gases coming from the lower portion of the furnace, are all passed through the stack $s$. When the pre-heating of the elements of the charge is completed, the materials are fed through the opening $e'$ into the smelting chamber, said opening then being sealed up by the heaping up of material around it to prevent the escape of the gases through it. Now by passing an electric current of sufficient strength from one molten electrode to the other through the materials contained in the smelting chamber, the required temperature in said chamber may be maintained. This temperature should be sufficiently high to volatilize zinc, but not sufficient to volatilize lead. The materials of the furnace charge having been selected and proportioned so as to form a slag, saturated with lime, at this temperature, said temperature will not rise, as long as the supply of slag-forming material is kept up, any excess of current only increasing the rate of smelting. The ore is reduced by the heated body of carbon, the fixed oxygen of the metallic oxids combining with the carbon to form carbon monoxid, leaving the metals in a free state. The metallic lead sinks through the slag and adds to the molten electrodes in the wells $a'$ $a^2$ so that it may be ladled out through the outer arms of the U-shaped passages through the furnace walls. The metallic zinc liberated is volatilized and passes through the opening $m$ over the bridge $n$ into the condensing chamber $k$. The temperature in this chamber is kept between such limits that the zinc is condensed in said chamber in a liquid form, from which it may be removed through the well $p$. Any remaining gases, as before described, pass through the flues $k'$ into the roasting chamber $f$ where they are burned to produce heat in the roasting chamber. The waste products of combustion thence pass off through the stack $s$.

It is essential to the proper conduct of this process that the production of gaseous zinc should take place in the absence of free oxygen, to prevent the zinc from being burned to oxid, and the development of the heat inside the furnace by an electric current, instead of by the burning of coke, fully meets this condition. It is further essential, in order to secure proper condensation of the zinc, that the elements of the furnace charge and the fluxes used should be such as to produce the minimum quantity of gas during smelting.

I claim:

1. The herein-described process of treating zinc-lead ores, in which the ore is smelted with carbon upon a slag bath which is floated upon a molten lead electrode in an electric furnace from which air is excluded, electric current being passed through the slag between said molten electrode and a second electrode in contact with the slag, and the temperature thereby maintained at a point between the volatilization temperatures of lead and zinc; whereby the ores of lead and zinc are reduced and the metals separated, the lead sinking through the slag to add to said electrode, while the zinc is vaporized and separately collected.

2. The continuous process of treating slag forming ores containing zinc and lead, which consists in pre-heating the ore with carbon to drive off gases and to start the process of reduction, then continuing the reduction in an electric furnace in the absence of air, at a temperature sufficient to volatilize the zinc without volatilizing the lead, said ore being mixed with carbon and with iron, silica and lime in such proportions as to form a slag at said temperature, said mixture being fed upon a bath of said slag in the furnace, an electric current being passed through said slag to maintain said temperature, collecting the reduced and volatilized zinc, removing the other products of smelting and adding further charges from time to time, including quantities of carbon in excess of the amount required for reduction, without interrupting the operation or admitting air.

3. The continuous process of treating slag-forming ores containing zinc and lead, which consists in mixing said ores in such proportions, with slag-forming material, as to produce a slag which forms at a temperature between the volatilization temperatures of zinc and of lead, smelting said mixture with carbon in the absence of air in an electric furnace, maintaining a supply of said mixture in said furnace by adding fresh charges from time to time, removing the products of smelting while conducting the operation, whereby the metals are reduced and separated and the formation of slag from said mixture prevents the temperature of the furnace from rising to a point at which considerable quantities of the lead would volatilize.

4. The continuous process of treating slag-forming ores containing zinc and lead, which consists in pre-heating the ore with carbon to drive off gases and to start the process of reduction, then continuing the reduction in an electric furnace in the absence of air, at a temperature sufficient to volatilize the zinc without volatilizing the lead, said ore being mixed with carbon and with iron, silica and lime in such proportions as to form at said temperature a high lime slag, such mixture being fed upon a bath of said slag in the furnace, passing an electric current through said slag bath sufficient to maintain said temperature, collecting and condensing the reduced and volatilized zinc, removing the other products of smelting and adding fresh charges from time to time, including quantities of carbon slightly in excess of the amount required for reduction, without interrupting the operation or admitting air.

5. The herein described process of treating lead-zinc ores, which consists in maintaining two separate bodies of lead in molten condition at a distance from each other to serve as electrodes, electrically uniting said bodies of lead by a bath of molten slag floated thereon, gradually feeding said ore, together with carbon and an alkaline oxid flux onto said slag bath in the absence of air, and passing an electric current from one of said bodies of lead to the other through said slag, sufficient to maintain the slag at a temperature between the volatilization temperatures of lead and zinc, the metals being thereby reduced and separated, the zinc volatilizing and rising above the bath, while the lead in a molten state sinks through the bath and joins the lead electrodes.

6. The process of smelting zinc ore, which consists in preheating such ore, smelting the preheated ore with carbon and fluxes in the absence of air by electrical heat, condensing the zinc vapor from the gaseous products of reduction, and then burning the uncondensed gases over and in contact with the ore which is being preheated, whereby the metallic oxids produced in such burning are deposited on the ore and returned to the smelting furnace, as described.

In witness whereof, I hereunto subscribe my name this 21st day of June, A. D., 1905.

FREDERICK T. SNYDER.

Witnesses:
  DE WITT C. TANNER,
  IRVING MACDONALD.